United States Patent

Bryant, Jr.

[15] 3,684,834

[45] Aug. 15, 1972

[54] APPARATUS FOR REMOTELY CHANGING THE MESSAGE OF AN AUTOMATIC ANNOUNCING MACHINE

[72] Inventor: Ellis H. Bryant, Jr., Atlanta, Ga.

[73] Assignee: The Audrichron Company, Atlanta, Ga.

[22] Filed: July 10, 1970

[21] Appl. No.: 56,183

Related U.S. Application Data

[63] Continuation of Ser. No. 787,634, Dec. 30, 1968, abandoned.

[52] U.S. Cl. .................... 179/6 E, 179/6 C, 179/2 A, 179/1 SA

[51] Int. Cl. .................... H04m 1/64

[58] Field of Search .......... 179/6 C, 6 D, 1 SA, 2 DP

[56] References Cited

UNITED STATES PATENTS

| | | | |
|---|---|---|---|
| 3,249,919 | 5/1966 | Scantlin | 340/152 |
| 3,436,483 | 4/1969 | Blane | 179/6 |
| 2,889,506 | 6/1959 | Fogiel | 318/604 |
| 3,360,612 | 12/1967 | Klumb | 179/90 |
| 3,347,989 | 10/1967 | Riddell | 179/6 |
| 1,302,767 | 5/1919 | Clausen | 179/6 TA |
| 2,784,254 | 3/1957 | Lane | 179/6 R |
| 3,106,612 | 10/1963 | Lemelson | 179/6 E |
| 3,141,931 | 7/1964 | Zarouni | 179/6 CO |
| 3,286,033 | 11/1966 | Lemelson | 179/6 E |

FOREIGN PATENTS OR APPLICATIONS

| | | | |
|---|---|---|---|
| 421,059 | 12/1934 | Great Britain | 179/6 E |

*Primary Examiner*—Bernard Konick
*Assistant Examiner*—Raymond F. Cardillo, Jr.
*Attorney*—Jones & Thomas

[57] ABSTRACT

An encoding device for the remote programming of announcing systems such as weather announcing systems includes circuitry for signalling a central location and altering the information to be relayed to a subscriber from the announcing apparatus by dialing coded information symbolic of the desired information to be relayed. The information is encoded into alternating frequencies by an encoder to position a four stage resistor stepping switch to provide the necessary operating signals for selecting the desired announcement. The encoder apparatus includes circuitry to relay the coded announcement signal to the remote location and circuitry for signalling the central telephone system that the announcing information is being altered and to prevent access to the announcing system by subscribers. The encoder may be tied electrically into the telephone system or be connected into the telephone system via the programmer's telephone mouthpiece.

16 Claims, 6 Drawing Figures

PATENTED AUG 15 1972

3,684,834

INVENTOR

Ellis H. Bryant, Jr.

BY

ATTORNEYS

INVENTOR
Ellis H. Bryant, Jr.
BY
Watson, Cole, Grindle & Watson
ATTORNEYS

INVENTOR
Ellis H. Bryant, Jr.

BY Watson, Cole, Grindle & Watson
ATTORNEYS

INVENTOR
Ellis H. Bryant, Jr.

BY Watson, Cole, Grindle & Watson
ATTORNEYS

INVENTOR
Ellis H. Bryant, Jr.

BY Watson, Cole, Grindle & Watson
ATTORNEYS

APPARATUS FOR REMOTELY CHANGING THE MESSAGE OF AN AUTOMATIC ANNOUNCING MACHINE

This is a continuation of Application Ser. No. 787,634, filed Dec. 30, 1968, now abandoned.

This invention relates to remote encoding apparatus and more particularly to such apparatus which is used in conjunction with a telephone system or network to gain access to an announcing system in order to alter the message to be announced upon request thereto by a subscriber.

Time, weather and temperature announcing machines which are used in connection with a telephone network or system are well known to the art. Such announcing systems have provided the public with up-to-date information regarding the time, status of the weather and the temperature by merely dialing a given telephone number which connects the subscriber to a central location and activates the announcing apparatus. Many improvements have been made in such announcing equipment; however, there remains a great need for further sophistication in such equipment and particularly in the manner in which the announcing format may be altered or programmed and especially reprogrammed to accomplish that from a remote location.

This invention provides an automatic encoding apparatus for coding dialed information representative of a desired alteration in an announcing format at a remote location via a telephone network. The connection with the announcing center is made in response to the dialing of an unsubscribed number whereupon the announcing format may be re-programmed from the remote location by dialing digits which are then coded into alternating tone frequencies and decoded at the announcing location to produce signals which control the positions of four stage decade stepping switches in order to provide the necessary control signals to activate the servo mechanism which positions the read head of the announcing machine on the desired track of the magnetic drum.

The coding system described herein is designed to be used with a weather announcing system which combines pre-recorded weather announcements with time-temperature announcing systems. In such a system, a typical composite announcement might be:

"Open a Convenient First National Bank Checking Account, First National bank Time . . . 1:45, Weather Forecast . . . Fair Today, Tonight, and Tomorrow, with Little Change in Temperature. It is Now 65°."

The encoder described herein permits the weather announcement to be changed from a remote location. The machine may also be programmed at the central office where the announcing apparatus is located by use of manual controls located, for example, on a convenient control panel.

Weather announcing mechanisms are well known in the art and are driven by an 1,800 rpm synchronous motor and, through internal gearing, reduced to 12 rpm at the record shaft. The recording may contain a number of different pre-recorded weather announcements which are located circumferentially on the record surface, each track being adjacent to its neighboring track and perhaps separated by a guard track. In such systems the sound pick-up head may be lowered to the record surface in a prescribed predetermined cyclic manner for the weather announcement at the conclusion of the pick-up head is returned to its original position.

A two-phase servo induction motor may be coupled to a lead screw and clutch assembly to position the sound carriage assembly with the sound pick-up head in proper alignment with the desired announcement. A servo balance motor is energized as a component of a servo system employing a slide wire mounted adjacent and parallel to the sound carriage, a servo amplifier and the necessary circuitry for local and remote programming. One such machine is shown in U.S. Pat. No. 3,161,729.

The time, weather, and temperature mechanisms are driven by identical 1,800 rpm synchronous motors. The announcements from the weather machine are phased with the announcement from the time machine, so that it follows the silent period immediately after the time announcement. The temperature announcement then immediately follows the weather announcement.

The aforementioned apparatus is all well known to the art and consequently there is no need to describe it in detail herein. The remote programming equipment in accordance with the present invention may be contained in a separate unit with appropriate output leads connected to the tip and ring of the telephone line at the remote location or by acoustically encoupling the encoder speaker into the telephone transmitter. By dialing an unlisted number which is assigned to the decoder trunk circuit on a regular telephone, the encoder unit of this invention is then connected to the programming equipment to transmit signals corresponding to the selection of a desired weather announcement.

It is a primary object of the present invention to provide encoding apparatus for the remote alternation of an announcing program of pre-recorded messages.

It is another object of this invention to provide an encoding apparatus which operates in conjunction with an existing telephone number whereby the announcing program may be altered by dialing coded information into the telephone network.

It is yet a further object of this invention to provide simple and inexpensive encoding apparatus which is easily installed and maintained to provide remote programming of an announcing station.

The foregoing and other objects of the invention will be more apparent to those skilled in the art with the following description of an embodiment of the encoding apparatus with the aid of the following drawings wherein.

When it is desired to alter or change the programmed announcements in the aforementioned weather announcing system according to the disclosed embodiment of the present invention, a conventional telephone is used to call a special subscriber number which is connected to the weather announcing station as disclosed herein. When this special number is dialed, the telephone central office equipment causes the calling party to be connected across contacts K and L of the terminal strip shown in FIG. 5. It will be understood by those skilled in the art that the alternating current ringing signal passes through capasitance C2 and is rectified by diodes D1 and D2 to provide a voltage which actuates the coil of the relay A. Actuation of the relay A causes a holding path to be established from the terminal strip contact K, through relay contact 6, diode D3, the coil of the relay A, and thence to the terminal contact L to maintain the relay A energized.

Figure 5:
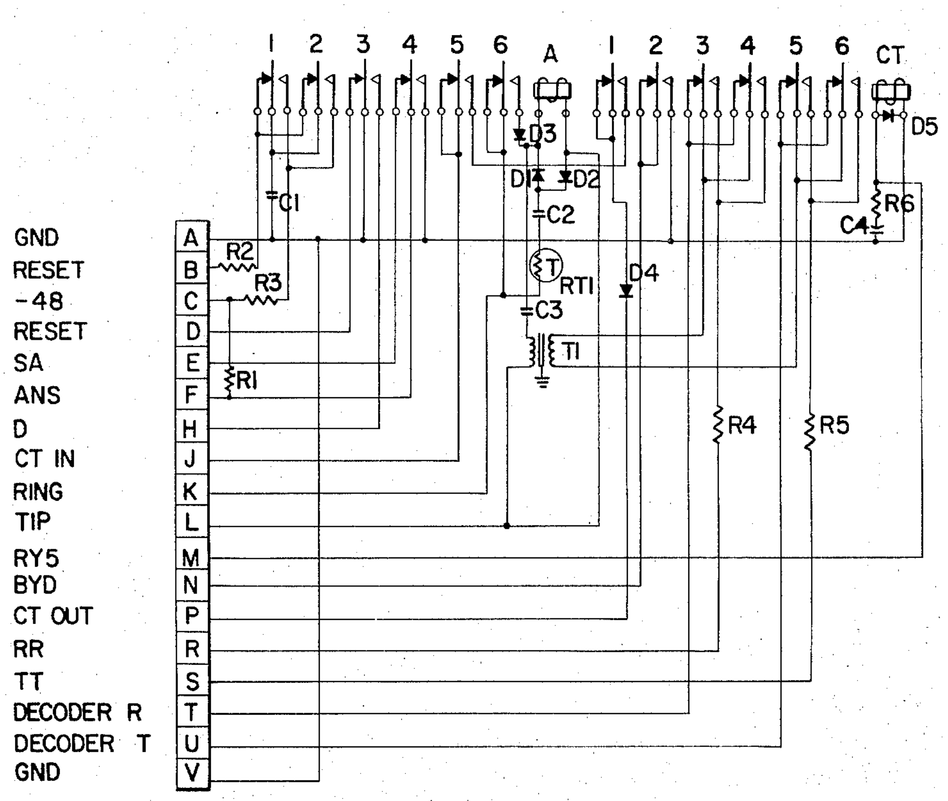
FIG. 5 is a schematic of additional relay circuitry used in conjunction with the decoder apparatus.

It can now be seen that the primary winding of the transformer T1 in FIG. 5 is connected across the contacts K and L, which correspond to the "ring" and "-tip" telephone lines as used in conventional telephone terminology.

The secondary winding of transformer T1 is connected to contacts 3, 4 and 5, 6, respectively, of the relay CT. Since the relay CT is not energized at this time, the secondary winding of the transformer T1 is connected to the contacts T and U of the terminal strip shown in FIG. 5 and thence, according to the disclosed embodiment, to the corresponding terminal strip contacts T and U of that portion of the decoder apparatus depicted in FIG. 1.

Figure 3:
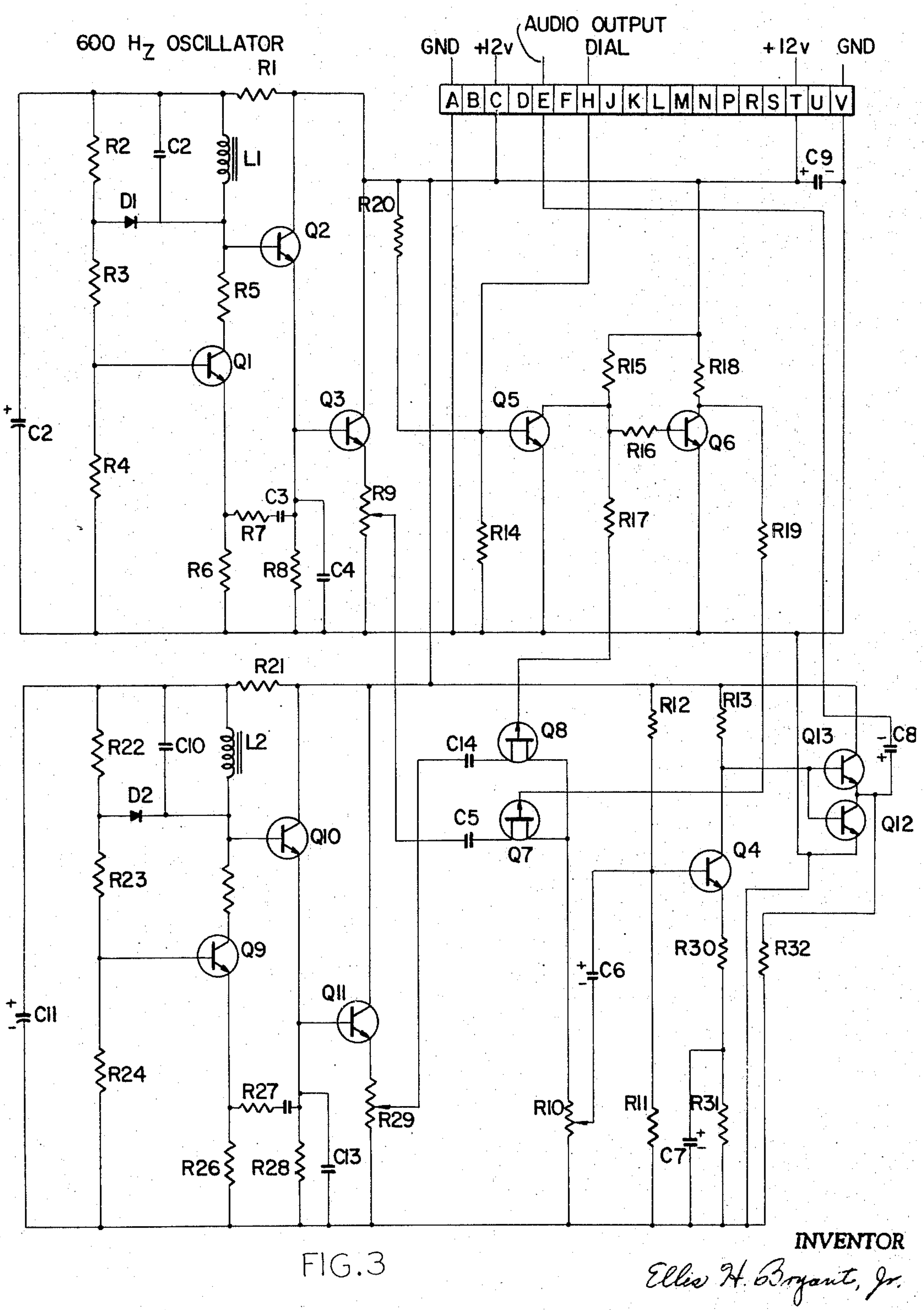
FIG. 3 is a schematic of the oscillators for generating the necessary alternating frequency signals used in coding the data.

The calling party who has been connected to the announcing apparatus by the telephone central office must now gain access to the announcing apparatus, so that a desired coded signal can be transmitted to reprogram the announcement messages. To accomplish this, the calling party places the mouthpiece of his telephone next to the speaker of the encoder apparatus, as pictorially shown in FIG. 6 and as schematically shown in FIG. 3. Turning to FIG. 3, those skilled in the art will recognize a first oscillator circuit including the transistors Q1 and Q2 connected to the frequency-determining tuned circuit including C2 and L1. The parameters of this first oscillator circuit are selected to generate a 600 Hz output, and this output is amplified through transistor Q3 and is fed through potentiometer R9 and capasitance C5 to the source electrode of field effect transistor Q7. Similarly, a second oscillator including the tuned circuit defined by capacitance C10, inductance L2, and transistors Q9 and Q10 is tuned to provide a 1,500 Hz output which is amplified through transistor Q11 and then is fed through the potentiometer R29 and capacitance C14 to the source of field effect transistor Q8.

The drains for both field effect transistors Q7 and Q8 are connected together to a potentiometer R10. Only one of Q7 and Q8 is allowed to conduct at one time, as described below, and the 600 Hz signal or the 1,500 Hz signal, depending on which field effect transistor is conducting, passes from the potentiometer R10 and the amplifier circuitry including transistors Q4, Q12, and Q13 to contact E, labeled "audio output," on the terminal strip shown in FIG. 3. The speaker pictorially shown in FIG. 6 is connected to this audio output, so that there is selectively produced an audible signal either of 600 Hz or 1,500 Hz.

Figure 6:
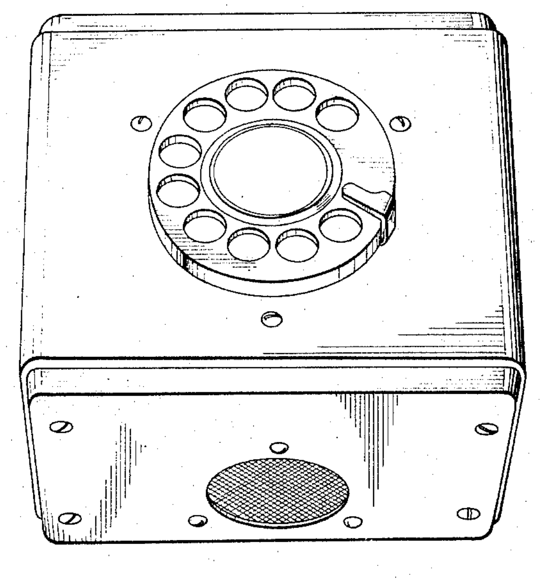
FIG. 6 is an illustration of the encoder apparatus.

The positive voltage is applied to contacts C and T of the FIG. 3 terminal strip through the off-rest switch contacts of the conventional telephone dial depicted in FIG. 6. As is known to those skilled in the art, the off-rest switching circuit of a conventional telephone dial is open when the dial is at rest. As soon as the dial is pulled around from rest position, however, the contacts close to apply the positive voltage to the terminal strip contacts C and T. Thus, a 600 Hz audio signal is immediately produced from the speaker when the dial is pulled around from rest position, since the base of Q5 is grounded through the dial-pulse switch connected to the circuit through terminal strip contact H ("dial").

In order to gain access to the decoding apparatus, explained hereafter, the calling party must dial an entry number which in the disclosed embodiment is the number 2. The dial-pulse switch, i.e., the make-break contact, which opens and closes sequentially while the dial returns from the dialed number to rest, removes ground from contact H two times when the number 2 is dialed. Each ungrounding of contact H causes Q5 to conduct and thereby causes Q6 to cut off; it will be seen, accordingly, that dialing the number 2 on the encoder causes the 600 Hz signal which commences when the dial is pulled from rest position, to be twice interrupted by 1,500 Hz pulses.

Figure 1:
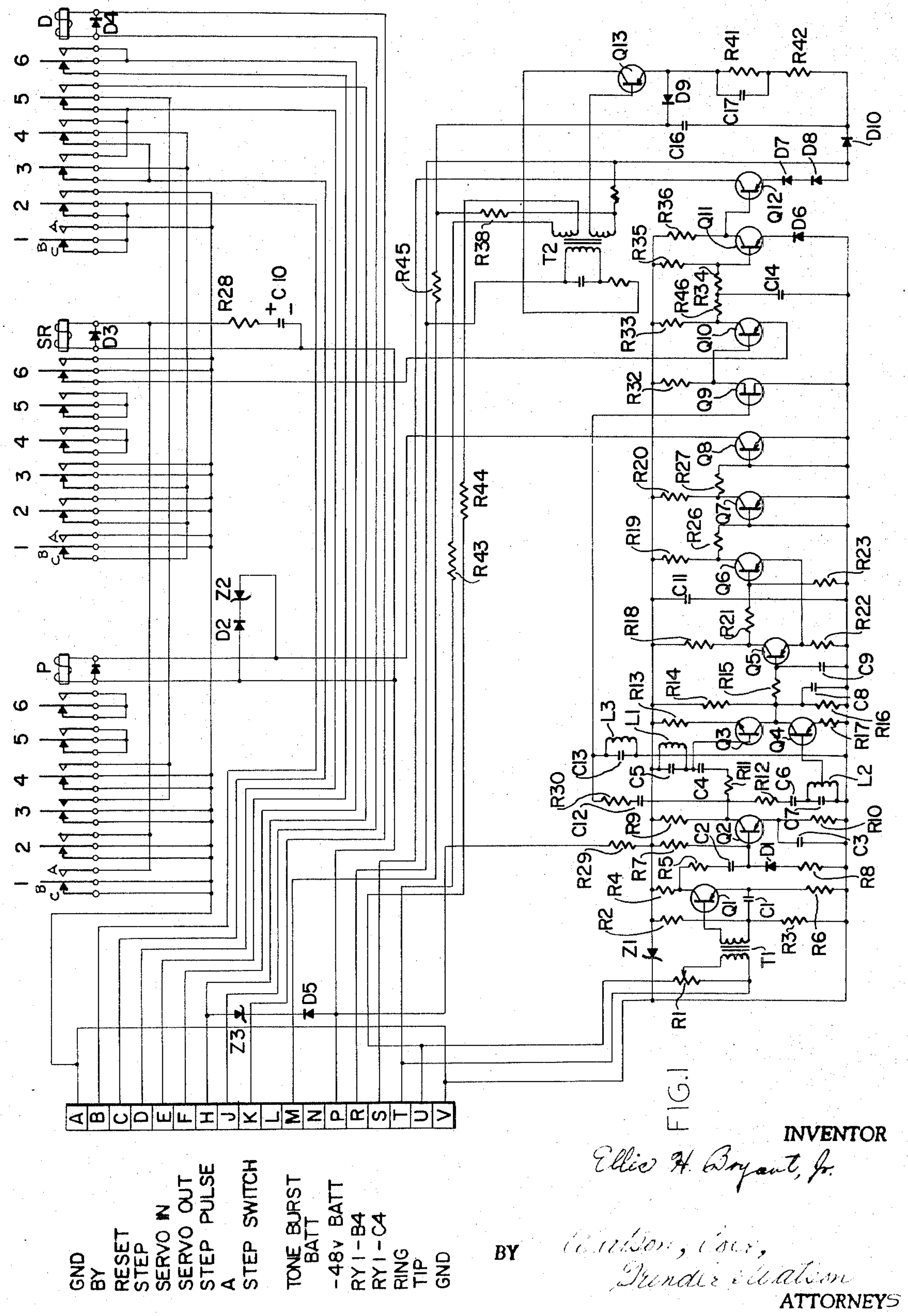
FIG. 1 is a schematic drawing of tone decoder circuitry for decoding the information sent by the remote location.

Returning to the decoder portion of the present invention, signals caused by the audio pulses generated by the encoder of FIG. 6 are passed through the transformer T1 of FIG. 5 and are then applied through contacts T and U to the primary of the transformer T1 shown in FIG. 1. The audio output from transformer T1 (FIG. 1) is amplified by Q1 and Q2 and is then applied to three tuned circuits as follows: a 600 Hz circuit including capacitance C13 and inductance L3; another 600 Hz circuit including capacitance C5 and inductance L1 and a 1,500 Hz circuit including capacitance C7 and the center-tapped inductance L2. It will be seen that the tuned circuit including C5 and L1 provides an output to the base of transistor Q3, and the center tap of the 1,500 Hz tuned circuit is connected to the base of transistor Q4 so that when there is a 600 Hz signal applied through the transformer T1 (FIG. 1) to the tuned circuits, Q3 conducts to keep Q5 cut off.

When the circuit receives a 1,500 Hz tone corresponding to a dial pulse, the 1,500 Hz tuned circuit including C7 and L2 passes a signal which causes Q4 to conduct, thereby connecting the collector of Q3 at substantially ground potential by way of the contact V of the terminal strip in FIG. 1. A negative-going pulse thus is applied to the transistor Q5 which, along with transistor Q6, will be recognized as a Schmidt trigger circuit. The square wave output from the Schmidt trigger causes transistor Q7 to stop conducting and thus enables the relay driver transistor Q8 to conduct to complete the circuit through the coil of the relay P in FIG. 1.

To recapitulate, it will now be apparent from the foregoing description that when a 600 Hz signal is received by the decoding apparatus the transistor Q8 will not conduct and the relay P will not be energized. When a 1,500 Hz signal is received, however, Q8 conducts to energize the relay P. Since there is a 1,500 Hz signal corresponding to the number dialed on the encoder of FIG. 6, relay P pulses a number of times corresponding to the dialed number.

Each closure of contact 1 of relay A completes the circuit through the coil of relay SR so that the relay SR is energized when relay P is energized. Resistance R28 and capacitance C10 are series-connected in parallel with the SR relay coil, and it will be recognized by those skilled in the art that this R-C circuit delays the release of relay SR when voltage has been removed from its coil. The values of R28 and C10 are chosen so that the relay SR does not open between the pulses of relay P. Accordingly, relay SR is energized on the first pulse of the relay T and remains energized through the last pulse of the relay P.

Figure 2:
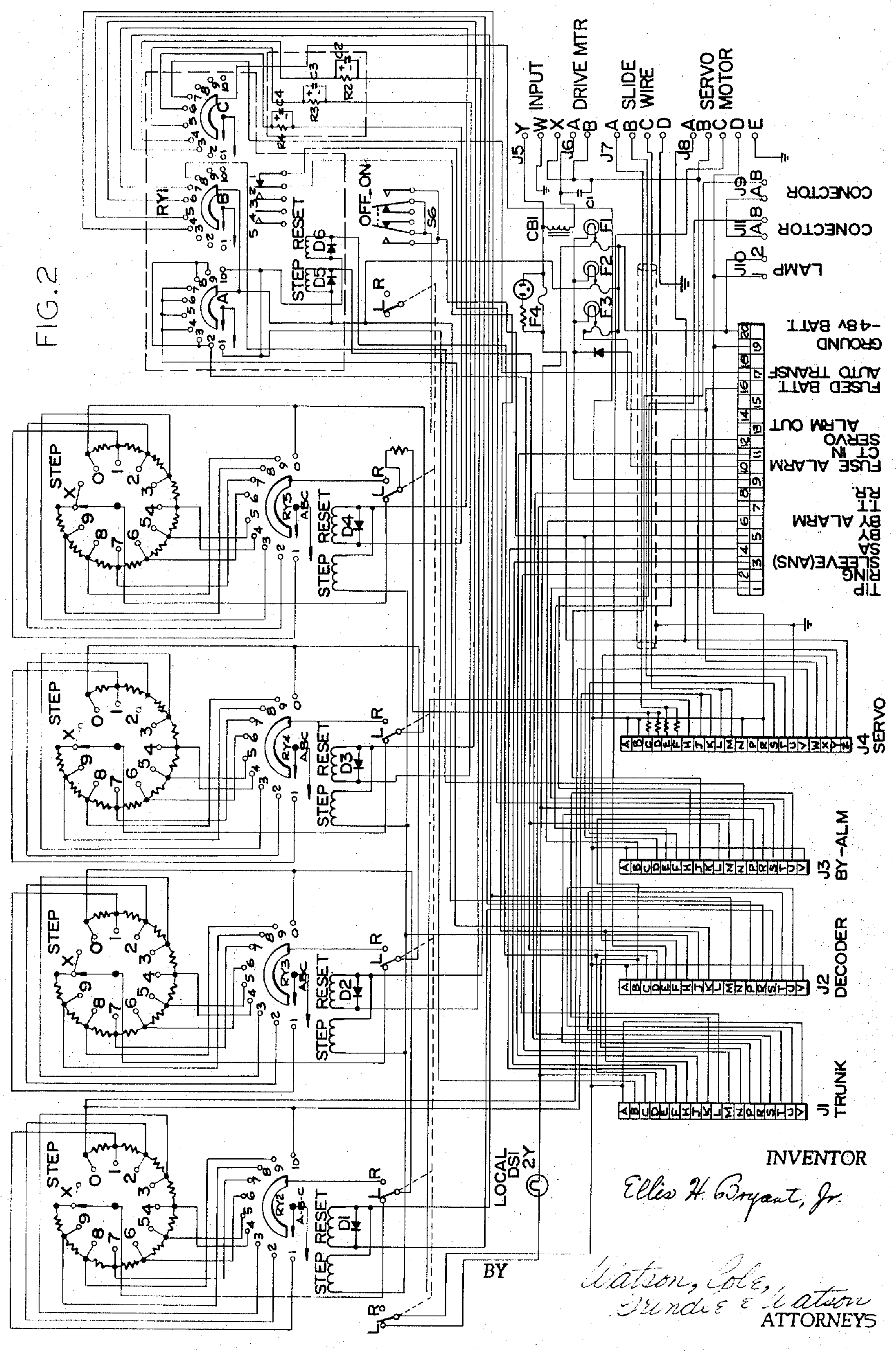
FIG. 2 is a schematic representation of the four decade resistor switches and the control circuitry for the decoder.

Since relay D is not energized, a ground circuit is completed from the connector contact A, through contact 3 of relay P. Contact 5 of relay D, and the contact D on the terminal strip of FIG. 1. Turning now to FIG. 2 of the drawing and observing the terminal strip labeled "J2 DECODER," it is seen that the contact D thereon is connected to one side of the stepping coil of the decade switch RY1. Since the other side of the RY1 stepping coil is connected −48 volts through contact P of the terminal strip J2, the stepping coil is energized and switch RY1 moves to position 1.

The foregoing sequence of events is repeated each time the relay P (of FIG. 1) pulses; reception by the decoder apparatus of the dialed digit 2, which causes the relay P to pulse two times, also causes the switch RY1 to be stepped two times so that the switch is moved to the "two" position.

When switch RY1 is at the "two" position, a circuit is completed in deck A of that switch to apply −48 volts to contact M of the terminal strip labeled "J1 trunk" which, it can be seen, is also the contact strip shown in FIG. 5. The voltage thus applied to contact M causes the relay CT of FIG. 5 to be energized so that the secondary of the transformer T1 (FIG. 5) is transferred through contacts 3, 4 and 5, 6 of the relay CT from the contacts T, U to the contacts R, S of the terminal strip. Contacts R and S, which are respectively further identified on FIG. 5 by the abbreviations "RR," standing for ring-ring, and "TT," stand for tip-tip, are connected to receive an audio signal according to conventions of nomenclature understood in the art, and so it can be seen that contacts R and S receive the current audio announcement from the announcing system.

It will now be observed that the audio portion of the announcing system is connected through relay CT and transformer T1 to the telephone line and thence to the telephone of the party who has called the special number. Closure of relay CT also connects ground contact A through relay contact 2 to the pin N which goes to additional circuitry (not forming part of the present invention) to put a busy signal on the incoming telephone trunk normally used by callers for listening to the recorded message.

Figure 4:
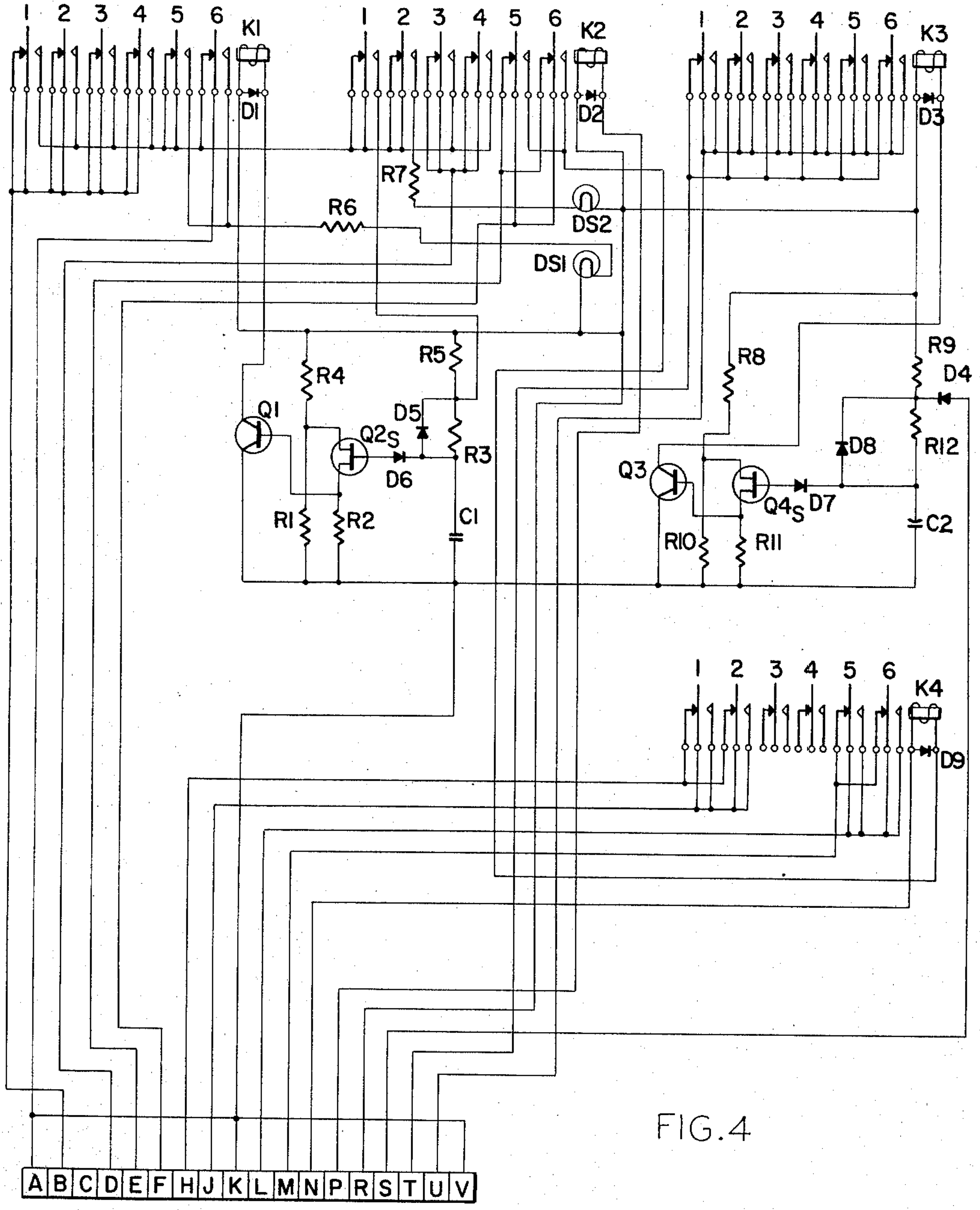
FIG. 4 is a schematic of the busy alarm circuit which is used in conjunction with the decoder apparatus to provide a busy signal to the central telephone network.

Recorded message announcement machines generally operate continuously so the calling party will hear some portion of the recorded message following his connection to the audio of the announcing machine. At the end of this message and before the start of a new message, there will be produced a pulse recognized by those skilled in the art as a CT pulse, which is connected through contact J of FIG. 5, through contact 5 of relay A and contact 1 of relay CT, to the contact T on the terminal strip. Turning again to FIG. 2, it is seen that contact T of the terminal strip J1 therein is connected to contact M of the terminal strip J3 thereof. Turning next to FIG. 4 where the terminal strip J3 is also depicted, it is seen that the CT pulse passes through the contacts 5 and 6 of deenergized relay K4 and returns to pin L on the terminal strip J3. Looking again at FIG. 2, it can thus be seen that the pin L on the terminal strip J3 is connected to the stepping coil of switch RY1. Accordingly, the CT pulse causes the stepping coil to be energized to move RY1 from position 2 to position 3.

Deck A of switch RY1 still maintains −48 volts on the relay CT, and so the audio from the announcing apparatus remains connected to the telephone caller so that he will now hear a complete current announcement from the announcing machine. At the end of the complete announcement, another CT pulse is generated as before which follows the procedure outlined above and causes the switch RY1 to a step another time, moving the switch from position 3 to position 4. From the connections of deck A it will be seen that the −48 volts is now removed from the CT relay which opens to disconnect the contacts R and S of the calling party, who no longer hears an announcement from the announcing apparatus.

A number of other events occur upon the movement of RY1 to position 4. Deck A causes −48 volts to be supplied to contact K of J2 and referring to FIG. 1, it will be seen that a circuit is thus established from contact K through the coil of the relay D, back to contact J of that terminal strip. Once again referring to FIG. 2, contact J of terminal strip J2 is connected to contact H of terminal strip J1 and, referring next to FIG. 5, the contact H is connected through contact 3 of relay A to ground. The coil of relay D is thus placed between −48 volts and ground and is energized.

Turning next to deck B of switch RY1, −48 volts is provided through position 4 of deck B to the "step" and the "reset" coils of stepping switch RY2. Deck B of RY1 also supplies voltage through contact M of terminal strip J2 and thence to the apparatus of FIG. 1 to the circuitry including transistor Q13, which will be recognized as a tone burst oscillator. Deck C of switch RY1 concurrently causes ground potential to be connected through contact R of terminal strip J2 to the point (on FIG. 1) between diodes D8 and D10. Operating voltage thus is now applied across the tone burst oscillator, which operates in conjunction with the transformer T2 to provide an audio signal which is connected through contacts T and U on the terminal strip J2 and which is thereby supplied to the calling party. It will be apparent to those skilled in he art that the tone burst oscillator continues to function until the capacitance C16 is charged sufficiently to provide cut-off bias for the transistor Q13. At this point, of course, there will be no further operation of the tone burst oscillator until the voltage is removed therefrom. The capacitance C16 becomes discharged and a voltage is then reapplied.

When the calling party moves the dial of the encoder (FIG. 6) from rest position to dial the first one of the four numbers, it will be recalled that a 600 Hz signal is generated and is applied to the decoding apparatus of FIG. 1, including the capacitance C13 and the inductance L3. The signal from this tuned circuit causes the field effect transistor Q9 to be turned off, thereby biasing transistor Q10 into conduction. The emitter of transistor Q10 is grounded through contact 6 of the relay SR, which is deenergized at this time, so transistor Q10 conducts, transistor Q11 is turned off, and the transistor Q12 conducts to establish a ground connection through Q12, contact S of terminal strip J2, and the reset coil of the switch RY2, whereby that switch is reset to the "zero" position.

When the encoder dial is released, a number of 1,500 Hz pulses are produced corresponding to the diode number. These pulses cause the relay P to pulse a corresponding number of times as described previously. As soon as the relay P pulses the first time, the relay SR pulses and remains closed until the last pulse of relay P corresponding to the last pulse of the diode numbered. Closure of the relay SR causes ground potential to be removed from the emitter of the transistor Q10, thereby turning off Q12, releasing the reset coil of switch RY2, and placing this switch in condition to be stepped. Pulsing of the relay P causes ground potential pulses to be applied through contact 5 of relay D, contact H of terminal strip J2, and thence to one side of the step coils associated with stepping switches RY2, RY3, RY4 and RY5. Since the −48 volts was previously applied to the other side of the step coil associated with switch RY2, that switch now steps one position for each of the 1,500 Hz pulses received from the encoder so that the switch RY2 becomes set on a position corresponding to the digit dialed on the encoder dial.

After the last one of the dialed 1,500 Hz pulses is received, the relay P stops pulsing and the relay SR drops out after a brief delay, thus causing ground potential to be applied through relay D to the step coil for switch RY1 whereupon this switch is advanced from position 4 to position 5. Deck A of switch RY1 maintains the −48 volts on the relay D. Deck B of switch RY1 applies −48 volts to the step and reset coils of switch RY3, and Deck C of RY1 applies a ground potential through an R-C network to the reset coil of RY3. The reset coil of RY3 is thereby energized to permit this switch to be reset to zero; the reset coil of RY3 will be released when the capacitance of the aforementioned R-C network is fully charged. The apparatus is now ready for the next digit to be dialed.

When the caller again releases the encoder to provide a series of 1,500 Hz signals, the relay P of FIG. 1 again pulses for each dialed pulse, and these pulses are applied through deck B of RY1 to the step coil on switch RY3 to set that switch to a position corresponding to the dialed digit. Similarly, when the relay SR releases following the last pulse of the relay P, the stepping coil of switch RY1 operates to advance that switch to position 6.

In position 6 of RY1, deck A retains relay D operative, Deck B furnishes −48 volts to the reset and step coils of RY4, and deck C provides ground potential through an R-C network to the reset coil of switch RY4 to reset that switch to the "zero" position.

The apparatus is now ready for the third message code digit to be dialed, whereupon the switch RY4 will be set to a position corresponding to the dialed digit in a manner similar to the setting of switch RY3. Again, when the relay SR releases following the last pulse of relay P, the stepping coil of switch RY1 steps to position 7. In this position, deck A of switch RY1 maintains voltage on the coil of relay D, deck B furnishes −48 volts to the reset and step coils of switch RY5, and deck C supplies ground through an R-C network to the reset coil of switch RY5 to reset this switch to the "zero" position.

The last of the four digits corresponding to a portion of the announcement to be selected is dialed. As before, the relay P pulses in accordance with the dialed digit and the switch RY5 moves to the position corresponding to that digit. After the relay P has stopped pulsing, the relay SR drops out and the switch RY1 steps to position 8. In this position deck A of switch RY1 permanently removes voltage from the coil of relay D, permitting that relay to drop out, and again applies voltage to the coil of relay CT (FIG. 5). Deck B of the switch RY1 applies −48 volts by way of contact N, terminal strip J3, to the coil of relay K4 (FIG. 4). The other side of the relay coil K4 is connected through contact 6 of relay K2, contact F of J3, and thence to contact S of terminal strip J4. The circuit through the coil of relay K4 to ground is completed from contact S, terminal strip J4, through the rebalancing servo balancing system which controls the actual positioning of the sound pick-up heads in proper alignment with the desired announcement message portions, this latter apparatus forming no part of the present invention. After the servo balances, ground potential is removed from pin S of terminal strip J4 by the servo apparatus and the relay K4 drops out to allow the next CT pulse produced at the end of each announcement cycle on the announcing apparatus to advance the switch RY1 to position 9.

Concurrently with the aforementioned activation of the servo balancing system, closure of the relay CT again connects the tip-tip and ring-ring leads to the calling party who is connected to the recording apparatus to hear an announcement in progress, except for the weather announcement which is temporarily disabled while the servo is balancing. After balancing occurs as indicated above and the switch RY1 is advanced to position 9 by the next CT pulse, the calling party will hear a complete announcement including a full reprogrammed weather announcement. At the conclusion of this full announcement, the next CT pulse advances the switch RY1 to position 10. In this position deck A places −48 volts on the reset coil of the switch RY1, the other side of the reset coil being connected through contact C of terminal strip J2, through contacts 3 and 4 of relay D (FIG. 1) and contacts of relay SR to ground whereupon the switch RY1 is reset to the zero position.

At this time the calling party must decide if the recorded weather announcement which he heard is satisfactory. If he desires again to reprogram the weather message, he merely dials the entrance code digit 2 on the encoding apparatus whereupon the reprogramming mechanism is reset as described above to accept another 4-digit message reprogramming code.

If the calling party was satisfied with the reprogrammed weather message, however, he can hang up his telephone. If the telephone central office equipment has automatic time-out the polarity of tip and ring will be reversed to cause relay A (FIG. 5) to drop, thereby disconnecting the reprogramming apparatus from the telephone lines. If the central office is not equipped with automatic time-out, zero reset-induced closure of the off-normal switch depicted to be associated with the switch RY1 places ground potential on contact S of terminal strip J3 which, as shown in FIG. 4, completes a circuit to a timing circuit including diode D4, field effect transistor $Q4_S$ and transistor Q3. When this circuit times out, the relay K3 is energized to break the hold circuit for the relay A (FIG. 5) whereupon the calling party is disconnected.

Referring briefly to the operation of the timing circuit shown in FIG. 4, the normal absence of ground potential applied through diode D4 permits the capacitance C2 to be charged through resistances R9 and R12. The charge normally contained on the capacitance C2 maintains the field effect transistor $Q4_S$ cut off, which in turn maintains transistor Q3 cut off. When ground potential is placed on the diode D4 and through diodes D7 and D8 to the gates of the field effect transistor, current flows through the field effect transistor to bias the transistor Q3 into conductivity and thus to complete the circuit for the relay K3. The capacitance C2, along with the resistances R9 and R12, are selected to provide an appropriate time delay before the capacitance C2 becomes discharged sufficiently to allow the transistor $Q4_S$ to conduct.

It will be recalled that ground potential was supplied to the relay K9 during the positions 2 through 9 of the switch RY1, so that any incoming calls during the reprogramming cycle received a busy signal. An additional timing circuit is shown in FIG. 4, comprising field effect transistor $Q2_S$ and transistor Q1, which operates after a suitable time-out to energize the coil of relay K1. In this way, if the reprogramming cycle is not completed within the time-out period which controls the operation of K1, a circuit is closed by operation of K1 to provide an alarm at the telephone central office or elsewhere that the apparatus is out of service. It will be understood that the time-out period controlling the operation of K1 is sufficiently long to permit normal reprogramming of the apparatus to occur without generating an alarm signal.

It will be additionally seen that if the apparatus has been dialed by the special reprogramming number so that the relay A of FIG. 5 is energized but the entrance code digit 2 has not been dialed, the aforementioned operation of the timing circuit including transistors $Q4_S$ and Q3 causes the relay A to be opened and the calling party to be disconnected upon completion of the time-out. It is recognized that those skilled in the art to which this invention pertains will recognize obvious alternative embodiments for accomplishing the intended functions of the above-described invention and, therefore, the foregoing description merely provides a preferred embodiment for the remote programming of announcing systems to enable the invention to be satisfactorily put into practice and such description is not to be taken as a measure of the scope of the invention, which scope is set forth by the following claims.

What I claim is:

1. Apparatus for remotely altering the selection of a prerecorded program of an announcing system, comprising:
 means for communicating between an announcing station and a programming station remotely located therefrom,
 encoding means for generating signals to be transmitted over said communication means from said programming station to said announcing station, said signals being representative of information desired to be newly selected from the prerecorded program of said announcing station,
 control means responsive to said signals for activating said announcing station transmitting the previous selection from the prerecorded program therefrom to said programming station,
 said control means including means for indicating to said programming station that said announcing station is ready to accept coded instructions, and
 said control means further including means for decoding said signals to alter the selection of information for delivery from the prerecorded program of the announcing station.

2. Apparatus as in claim 1 wherein said control means further includes means for audibly transmitting the new selection of the prerecorded program from the announcing station to the programming station thereby enabling an operator at said programming station to hear the selected stored program.

3. Apparatus as in claim 1 wherein said means for encoding includes a telephone and means for dialing signals representing the desired program change and wherein the coded signals are audibly produced and transmitted to said announcing station via said telephone mouthpiece and said means for communicating.

4. Apparatus according to claim 1 wherein said control means includes a stepping switch and variable resistance means, said stepping switch being responsive to said encoded signals to control the flow of coded signals to said variable resistance means whereby predetermined resistances are established representative of a desired selection of information from said prerecorded program.

5. Apparatus for changing the selection of prerecorded messages on an automatic announcement system, comprising in combination;
 call responsive means operative in response to an incoming signal on a reprogramming circuit to establish data exchange contact with the reprogramming circuit;
 means responsive to the reception of a predetermined entry code signal received from the reprogramming circuit to establish message communication between the reprogramming circuit and the announcement system so that the message being repeated thereon is transmitted to the reprogramming circuit;
 message termination responsive means for supplying a predetermined signal to the reprogramming circuit upon the conclusion of a recorded message being transmitted thereto,
 said predetermined signal indicating that the apparatus is ready to receive a coded message selection signal;
 message selection means which is operative to control the announcement system to select at least one prerecorded message from a plurality of such messages;
 said message selection means being operatively associated with said message termination means to be thereby placed in condition to receive an incoming message selection signal; and signal decoding means connected to receive message selection signals incoming on the reprogramming circuit and to cause said message selection means to control the selection of a particular prerecorded message corresponding to the incoming message selection signal.

6. Apparatus as in claim 5, further comprising:

means responsive to the completion of message selection to establish message communication between the reprogramming circuit and the recorded announcement system to cause the selected recorded message to be transmitted over the reprogramming circuit.

7. Apparatus as in claim 5, wherein said means responsive to the reception of the predetermined entry code signal is additionally operative to enable the substitution of a busy signal for the recorded announcement in response to any inquiry seeking connection to the recorded announcement system.

8. Apparatus as in claim 5, wherein:

said decoding means is operative in response to the reception of message selection signals comprising discrete frequency pulses to cause said message selection means to select the particular prerecorded message which is represented by such discrete pulses.

9. Apparatus as in claim 8, wherein:

said message selection means comprises a plurality of individual selector means each of which is operative in response to a separate message selection signal to control the selection of a prerecorded message segment of the prerecorded message;

said decoding means being operative in response to the reception of separate message selection signals to cause the one of said selector means corresponding to a particular separate message selection signal to select the particular prerecorded message segment represented by the discrete pulses of such message selection signal.

10. Apparatus as in claim 9, further comprising:

selection signal directing means selectively operative to establish sequential message segment selection operation between said decoding means and each of said individual selector means;

said decoding means including means responsive to the termination of each separate incoming message signal to cause said signal directing means to establish message segment selection operation between said decoding means and the next one in sequence of said individual selector means.

11. Apparatus in claim 10, wherein:

said selection signal directing means is operative to cause each of said individual selector means to cancel any existing message segment selection thereon prior to selection of a message segment in response to a message selection signal.

12. Apparatus as in claim 9, further comprising means responsive to termination of the last one of said separate message selection signals to establish message communication between the reprogramming circuit and the recorded announcement system to cause the selected prerecorded message segments to be transmitted over the reprogramming circuit.

13. Apparatus as in claim 12, wherein said decoding means is responsive to the termination of transmission of the selected prerecorded message segments to be rendered responsive to the reception of another predetermined entry code signal received from the reprogramming circuit to enable selection of another prerecorded message.

14. Apparatus as in claim 9, in which the recorded announcement system is of the type wherein the selection of a particular prerecorded message from a plurality of such messages is accomplished by servo rebalancing under the control of a resistance bridge, wherein:

each of said selector means comprises a resistance selection switch which is operative in response to a particular separate message selection signal to select the resistance which enables the servo to become rebalanced at the particular prerecorded message segment represented by the discrete frequency pulses of such message selection signal.

15. Apparatus as in claim 14, further comprising:

selection signal directing means selectively operative to establish sequential message segment selection operation between said decoding means and each of said resistance selection switches;

said decoding means including means responsive to the termination of each separate message signal to cause said signal directing means to establish resistance selection operation between said decoding means and the next one in sequence of said resistance selection switches.

16. Apparatus as in claim 15, wherein said selection signal directing means is operative to cause each of said resistance selection switches to cancel any existing message segment positioning resistance selection therein prior to selection of a resistance which enables the servo to become rebalanced at the particular prerecorded message segment represented by the discrete pulses of the message selection signal.

* * * * *